United States Patent
Thapar et al.

(10) Patent No.: US 10,303,457 B2
(45) Date of Patent: May 28, 2019

(54) INITIATING UPDATE OPERATIONS

(71) Applicant: Microsoft Technology Licensing, LLC, Redmond, WA (US)

(72) Inventors: Gautam Thapar, Redmond, WA (US); Jimin Li, Bellevue, WA (US); Shiaf Ramlan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/981,044

(22) Filed: May 16, 2018

(65) Prior Publication Data

US 2018/0267790 A1   Sep. 20, 2018

Related U.S. Application Data

(60) Division of application No. 15/220,664, filed on Jul. 27, 2016, now Pat. No. 10,007,505, which is a continuation of application No. 13/568,987, filed on Aug. 7, 2012, now Pat. No. 9,405,526.

(51) Int. Cl.
  *G06F 8/656* (2018.01)
  *G06F 8/71* (2018.01)
  *G06F 8/65* (2018.01)

(52) U.S. Cl.
  CPC ............... *G06F 8/65* (2013.01); *G06F 8/656* (2018.02); *G06F 8/71* (2013.01)

(58) Field of Classification Search
  None
  See application file for complete search history.

(56) References Cited

U.S. PATENT DOCUMENTS

| | | | | |
|---|---|---|---|---|
| 5,560,023 A | * | 9/1996 | Crump | G06F 1/3203 713/321 |
| 7,028,225 B2 | * | 4/2006 | Maso | G06F 11/3438 702/186 |
| 7,210,010 B2 | * | 4/2007 | Ogle | G06F 9/3001 711/162 |
| 7,581,217 B2 | * | 8/2009 | Jhanwar | G06F 8/65 717/168 |
| 7,805,719 B2 | * | 9/2010 | O'Neill | G06F 8/654 717/168 |
| 7,873,957 B2 | * | 1/2011 | Nallipogu | G06F 8/61 717/168 |
| 8,200,886 B2 | * | 6/2012 | Ogle | G06F 9/3001 711/103 |

(Continued)

*Primary Examiner* — Isaac T Tecklu

(57) ABSTRACT

Techniques for initiating update operations are described. In implementations, updates are gathered for a computing device, and grouped based on whether the updates involve a device restart and/or shutdown operation to be installed. Thus, updates that involve a restart can be installed as a group, such as part of a single update and restart operation. In at least some implementations, an update and restart operation for installing updates can be scheduled. A user can be notified of the upcoming update and restart operation, such as via notifications presented in various ways on a computing device. When a scheduled time for an update and restart operation arrives for a device, a variety of factors can be considered in determining whether to initiate the operation. For instance, user presence information and device state information can be considered.

20 Claims, 11 Drawing Sheets

(56) References Cited

U.S. PATENT DOCUMENTS

| | | | | |
|---|---|---|---|---|
| 8,245,220 B2* | 8/2012 | Imamatsu | G06F 8/65 | 717/171 |
| 8,572,598 B1* | 10/2013 | Kumar | G06F 8/65 | 717/168 |
| 8,601,170 B1* | 12/2013 | Marr | G06F 21/572 | 710/15 |
| 2002/0087668 A1* | 7/2002 | San Martin | G06F 8/65 | 709/221 |
| 2002/0092010 A1* | 7/2002 | Fiske | G06F 11/1417 | 717/168 |
| 2002/0147966 A1* | 10/2002 | Frazier | G06F 11/3409 | 717/127 |
| 2002/0184619 A1* | 12/2002 | Meyerson | G06F 8/65 | 717/173 |
| 2004/0181787 A1* | 9/2004 | Wickham | G06F 8/65 | 717/168 |
| 2004/0187103 A1* | 9/2004 | Wickham | G06F 8/65 | 717/168 |
| 2005/0060699 A1* | 3/2005 | Kim | G06F 11/1433 | 717/168 |
| 2005/0257215 A1* | 11/2005 | Denby | G06F 8/65 | 717/172 |
| 2007/0077887 A1* | 4/2007 | Kuwabara | H04W 52/0274 | 455/39 |
| 2007/0192763 A1* | 8/2007 | Helvick | G06F 8/65 | 717/168 |
| 2007/0245334 A1* | 10/2007 | Nieh | G06F 9/45533 | 717/168 |
| 2008/0028391 A1* | 1/2008 | Nallipogu | G06F 8/61 | 717/174 |
| 2008/0074444 A1* | 3/2008 | Morikawa | G09G 5/005 | 345/660 |
| 2009/0070756 A1* | 3/2009 | Wei | G06F 8/65 | 717/172 |
| 2009/0138875 A1* | 5/2009 | Rothman | G06F 8/61 | 717/173 |
| 2009/0144722 A1* | 6/2009 | Schneider | G06F 8/65 | 717/172 |
| 2009/0210868 A1* | 8/2009 | Parthasarathy | G06F 8/71 | 717/169 |
| 2010/0328331 A1* | 12/2010 | Iwaki | G09G 3/003 | 345/547 |
| 2011/0167419 A1* | 7/2011 | Ishikawa | G06F 8/65 | 717/171 |
| 2012/0124571 A1* | 5/2012 | Nagai | G06F 8/61 | 717/173 |
| 2012/0180034 A1* | 7/2012 | Hatamoto | G06F 8/65 | 717/168 |
| 2013/0074060 A1* | 3/2013 | Kim | G06F 9/485 | 717/168 |
| 2013/0132939 A1* | 5/2013 | Murata | H02J 7/041 | 717/173 |
| 2013/0166700 A1* | 6/2013 | Sudo | G06F 17/30557 | 709/219 |
| 2013/0205289 A1* | 8/2013 | Unno | G06F 8/65 | 717/171 |
| 2013/0227540 A1* | 8/2013 | Ruster | G06F 8/65 | 717/170 |
| 2014/0258699 A1* | 9/2014 | Hsu | G06F 11/1417 | 713/2 |

\* cited by examiner

INITIATING UPDATE OPERATIONS

PRIORITY

This application is a division of and claims priority to U.S. patent application Ser. No. 15/220,664 entitled "Initiating Update Operations" and filed Jul. 27, 2016, which is a continuation of and claims priority to U.S. patent application Ser. No. 13/568,987 entitled "Initiating Update Operations" and filed Aug. 7, 2012, the disclosures of which are incorporated by reference herein their entirety.

BACKGROUND

Computing devices typically include various functionalities that can be updated from time to time. For example, operating systems, applications, device drivers, firmware, and so forth, can be updated. A manufacturer or other entity associated with such functionalities can issues updates, such as to address a security vulnerability, fix a software bug, solve a compatibility issue, enhance functionality, and so on.

Installing some updates involves replacing a current version of a file with an updated version of the file. If the current version of the file is in use (e.g., a running operating system file on an active device), an update process typically involves closing the current version of the file and replacing it with the updated version. For example, a device can be restarted (e.g., shut down and rebooted) to enable the current version of the file to be closed and replaced with the updated version. In certain situations, however, device restarts can be disruptive to a user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for initiating update operations are described. In implementations, updates are gathered for a computing device, and grouped based on whether the updates involve a device restart and/or shutdown operation to be installed. Thus, updates that involve a restart can be installed as a group, such as part of a single update and restart operation.

In at least some implementations, an update and restart operation for installing updates can be scheduled. For example, the update and restart operation can be scheduled to occur after a particular time period, such as in hours, days, and so forth. A user can be notified of the upcoming update and restart operation, such as via notifications presented in various ways on a computing device. Further, the form and/or frequency of such notifications can be escalated as a scheduled time for the update and restart operation approaches. Thus, a user can be provided with a variety of different forms of notification of the operation, and can be given different opportunities to initiate the operation.

When a scheduled time for an update and restart operation arrives for a device, a variety of factors can be considered in determining whether to initiate the operation. For instance, user presence information can be considered. If user presence is detected at a device, such as based on user interaction with the device, a notification that the update and restart operation is imminent can be presented. If the device is in a viewing mode, however, the notification can be delayed until a user exits the viewing mode. For example, the viewing mode can correspond to a full-screen viewing mode, such as for viewing video content, playing a video game, and so forth. Alternatively or additionally, a notification of an imminent update and restart operation can be delayed and presented in response to a subsequent device unlock and/or logon operation.

Device state can also be considered when determining whether to proceed with an update and restart operation. For instance, if state information may be lost if an update and restart operation is initiated, the operation can be delayed until the state information is saved such that it can be recovered after a restart. A variety of different state information can be considered, such as editing state for a document and/or other editing project, application state, state for background services running on a device, and so forth. When state information is determined to be secured (e.g., stored), an update and restart operation can be initiated.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
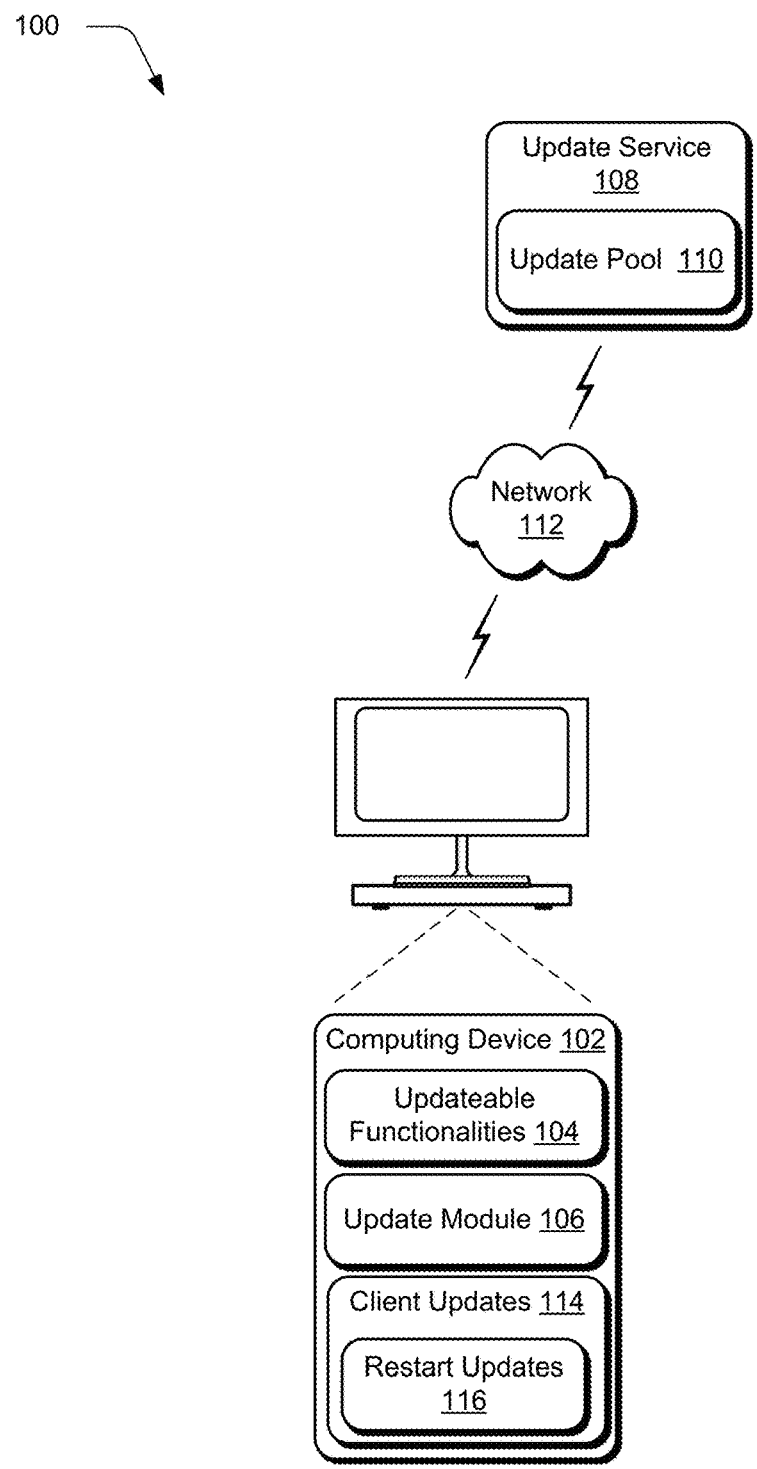
FIG. 1 is an illustration of an environment in an example implementation that is operable to employ techniques discussed herein.

Techniques for initiating update operations are described. In implementations, updates are gathered for a computing device, and grouped based on whether the updates involve a device restart and/or shutdown operation to be installed. For instance, a computing device can query an update service for available updates. As part of the query, the computing device can provide profile information for the computing device. Based on the profile information, the update service can identify updates for the computing device, such as operating system updates, application updates, driver updates, and so forth. The updates can be grouped into updates that involve a restart operation, and those that don't. Thus, updates in a restart group can be installed as a group, such as part of a single update and restart operation.

In at least some implementations, an update and restart operation for installing updates can be scheduled. For example, the update and restart operation can be scheduled to occur after a particular time period, such as in hours, days, and so forth. A user can be notified of the upcoming update and restart operation, such as via notifications presented in various ways on a computing device. For instance, a window (e.g., a pop-up window) can be displayed that includes information about the pending update and restart operation.

Further, existing windows and/or menus can be augmented to include information about the update and restart operation. For example, a login window can include such a notification, and may also present a user with a selectable option to initiate the update and restart operation. A variety of other forms of notification may be presented, as discussed in detail below. As also discussed below, the form and/or frequency of such notifications can be escalated as the scheduled time for the update and restart operation approaches. Thus, a user can be provided with a variety of different forms of notification of the operation, and can be given different opportunities to initiate the operation.

When a scheduled time for an update and restart operation arrives for a device, a variety of factors can be considered in determining whether to initiate the operation. For instance, user presence at a device can be considered. If user presence is detected at a device, such as based on user interaction with the device, a notification that the update and restart operation is imminent can be presented. If the device is in a viewing mode, however, the notification can be delayed until a user exits the viewing mode. For example, the viewing mode can correspond to a full-screen viewing mode, such as for viewing video content, playing a video game, and so forth. Alternatively or additionally, a notification of an imminent update and restart operation can be delayed and presented in response to a subsequent device unlock and/or logon operation.

Device state can also be considered when determining whether to proceed with an update and restart operation. For instance, if state information may be lost if an update and restart operation is initiated, the operation can be delayed until the state information is saved such that it can be recovered after a restart. A variety of different state information can be considered, such as editing state for a document and/or other editing project, application state, state for background services running on a device, and so forth. When state information is determined to be secured (e.g., stored), an update and restart operation can be initiated.

In the following discussion, an example environment is first described that is operable to employ techniques described herein. Example procedures and implementation scenarios involving techniques discussed herein are then described which may be employed in the example environment as well as in other environments. Finally, an example system and device are described that are operable to employ techniques discussed herein in accordance with one or more embodiments.

Example Environment

FIG. 1 is an illustration of an environment 100 in an example implementation that is operable to employ techniques for initiating update operations. Environment 100 includes a computing device 102 which can be embodied as any suitable computing device such as, by way of example and not limitation, a desktop computer, a portable computer, a handheld computer such as a personal digital assistant (PDA), mobile phone, tablet computer, and so forth. One of a variety of different examples of a computing device 102 is shown and described below in FIG. 11.

The computing device 102 of FIG. 1 is illustrated as including updateable functionalities 104, which are representative of functionalities that can be updated in various ways. Examples of the updateable functionalities 104 include an operating system, applications, services, device drivers, firmware, and so forth.

Further included as part of the computing device 102 is an update module 106, which is representative of functionality to manage various update operations for the computing device 102. For instance, the update module 106 can implement techniques for initiating update operations discussed herein.

An update service 108 is also illustrated, which is representative of functionality to manage updates for multiple devices and/or groups of devices. The update service 108, for instance, can receive updates from various entities, such as device manufacturers, software developers, information technology (IT) personnel, and so forth. The update service 108 can store the updates in an update pool 110 that can be accessed to provide updates to various devices, such as the computing device 102. Generally, an update can include software, computer code, an executable (e.g., a binary), and so on. Thus, an update can be used to augment or replace existing code and/or functionality.

For instance, consider a scenario where the update module 106 queries the update service 108 via a network 112 for available updates. The network 112 may assume a wide variety of different configurations, such as the Internet, a wide area network (WAN), a local area network (LAN), a wireless network, a public telephone network, an intranet, and so on. Further, although a single network 112 is shown, the network 112 may be configured to include multiple networks.

As part of the query, the update module 106 can provide various information about the computing device 102, such as profile information for the computing device 102. Examples of such profile information include identifiers for the updateable functionalities 104, such as an OS identifier, application identifiers, component device identifiers, and so forth. Profile information can also include identifying characteristics of the computing device 102, such as a manufacturer (e.g., an original equipment manufacturer (OEM,)) for the computing device 102, a make for the computing device 102 (e.g., the brand), a particular model of the computing device 102 (e.g., a model number), and so forth. For example, a particular manufacturer can have multiple makes (e.g., brands) of computing devices. Further, a particular make of computing device can encompass multiple different models.

For instance, the update module 106 can access or maintain a system management basic input/output system (SMBIOS) that specifies identification and configuration information for the computing device 102 that can be used to specify a device profile for the computing device 102.

Based on the device profile for the computing device 102, the update service 108 can identify updates that are available for the computing device 102. For example, the update service 108 can ascertain that updates are available for the updateable functionalities 104. The update service 108 can notify of the update module 106 of the available updates, and the update module 106 can enable the updates to be retrieved (e.g., downloaded from the update service 108) and installed on the computing device 102.

Updates that are retrieved can be stored as part of client updates 114, which represent updates that can be installed on the computing device 102. The client updates 114, for instance, can include updates that are retrieved from the update service 108 (e.g., the update pool 110) and stored locally on the computing device 102. Alternatively or additionally, the client updates 114 can include links (e.g., hyperlinks, network addresses, and so on) to remote locations where updates may be retrieved. Thus, in at least some implementations, the client updates 114 represent updates that have not yet been installed on the computing device 102.

Included as part of the client updates 114 are restart updates 116, which are updates that involve a restart of the computing device 102 to be installed. For example, the restart updates 116 can include replacements for files associated with the updateable functionalities 104. Thus, according to techniques discussed herein, the update module 106 can coordinate the installation of the restart updates 116 to reduce disruption of user interaction with the computing device 102 that may result from a restart of the computing device.

Having described an example environment in which the techniques described herein may operate, consider now a discussion of some example procedures and implementation scenarios in accordance with one or more embodiments.

Example Procedures and Implementation Scenarios

The following discussion describes example procedures and implementation scenarios for initiating update operations in accordance with one or more embodiments. In portions of the following discussion, reference will be made to the environment 100 of FIG. 1.

Figure 2:
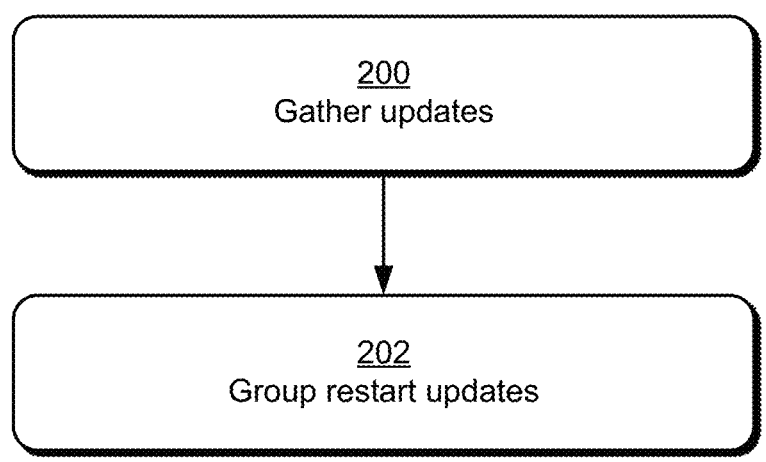
FIG. 2 is a flow diagram that describes steps in a method in accordance with one or more embodiments.

FIG. 2 is a flow diagram that describes steps in a method in accordance with one or more embodiments. Step 200 gathers updates. The update module 106, for instance, can query the update service 108 for updates for the computing device 102, such as updates for the updateable functionalities 104. As referenced above, the query can include various profile information about the computing device 102. Additionally or alternatively, the update service 108 can notify the update module 106 that updates are available for the computing device 102, e.g., independent of a query from the update module 106.

Step 202 groups restart updates. The update module 106 and/or the update service 108, for instance, can categorize updates into updates that do not involve a restart to be installed, and updates that do involve a restart to be installed ("restart updates"). Thus, in at least some implementations, restart updates can be separately grouped such that the restart updates can be installed in conjunction with a single restart and/or shutdown operation. With reference to the environment 100 discussed above, restart updates can be stored as part of the restart updates 116.

A variety of different factors can be considered to ascertain whether a particular update is a restart update. For instance, an update can be labeled as involving a restart, such as by a software developer and/or other entity that generated the update. As another example, updates that meet certain criteria can be automatically characterized as restart updates, such as an update that addresses a software bug, a software and/or hardware compatibility problem, a security vulnerability, and so forth. The update module 106 and/or the update service 108, for example, can be configured to automatically characterize an update as a restart update if it meets one or more of these criteria. Thus, in at least some implementations, an update can be pre-characterized as a restart update, or can be determined to be a restart update based on the update meeting one or more criteria for a restart update.

Figure 3:
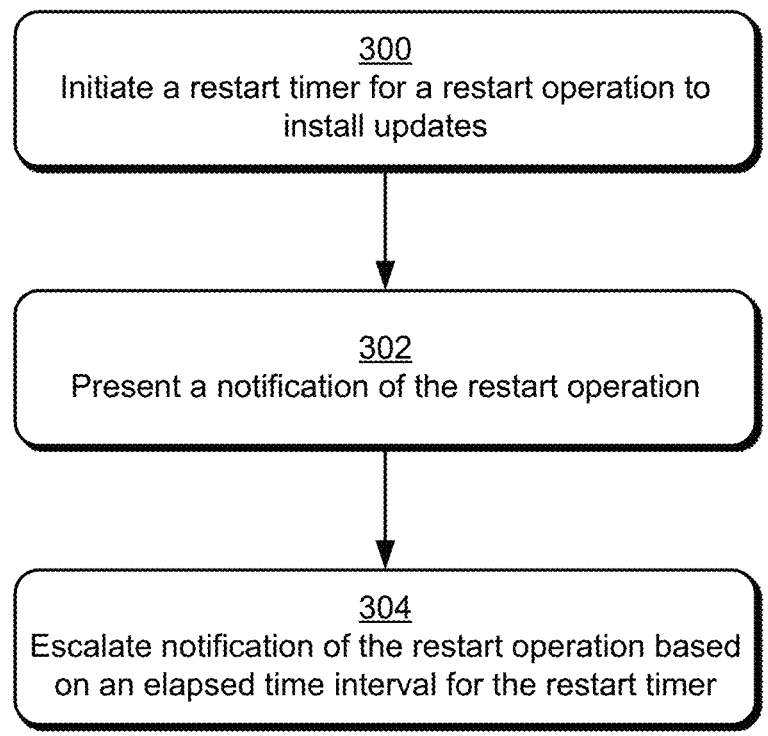
FIG. 3 is a flow diagram that describes steps in a method in accordance with one or more embodiments.

FIG. 3 is a flow diagram that describes steps in a method in accordance with one or more embodiments. Step 300 initiates a restart timer for a restart operation to install updates. The update module 106, for instance, can start a restart timer that counts down until a restart operation can be initiated to install updates, e.g., restart updates. The restart timer can be based on a predetermined time period, such as in minutes, hours, days, weeks, and so on.

Step 302 presents a notification of the restart operation. The notification, for instance, can display an indication that an update and restart operation is scheduled to occur when the restart timer expires. As an example, the notification can include a text message such as "This computer will restart and install updates in 3 days." In at least some implementations, the notification can include a selectable functionality (e.g., a radio button) that if selected via user input, causes a restart and install operation to be initiated. For example, user selection of the selectable functionality can cause the restart operation to be initiated prior to expiration of the restart timer, e.g., immediately in response to selection of the selectable functionality.

Step 304 escalates notification of the restart operation based on an elapsed time interval for the restart timer. The restart timer, for instance, can be divided into multiple sub-intervals. As the restart timer elapses and transitions from one interval to another, different notification schemes can be employed to notify a user of the upcoming update and restart operation. The different notification schemes can be utilized to ensure that the user is given multiple opportunities to be notified of the restart, as well as to give the user different opportunities to initiate the restart voluntarily. For example, consider the following implementation scenarios.

Figure 4:
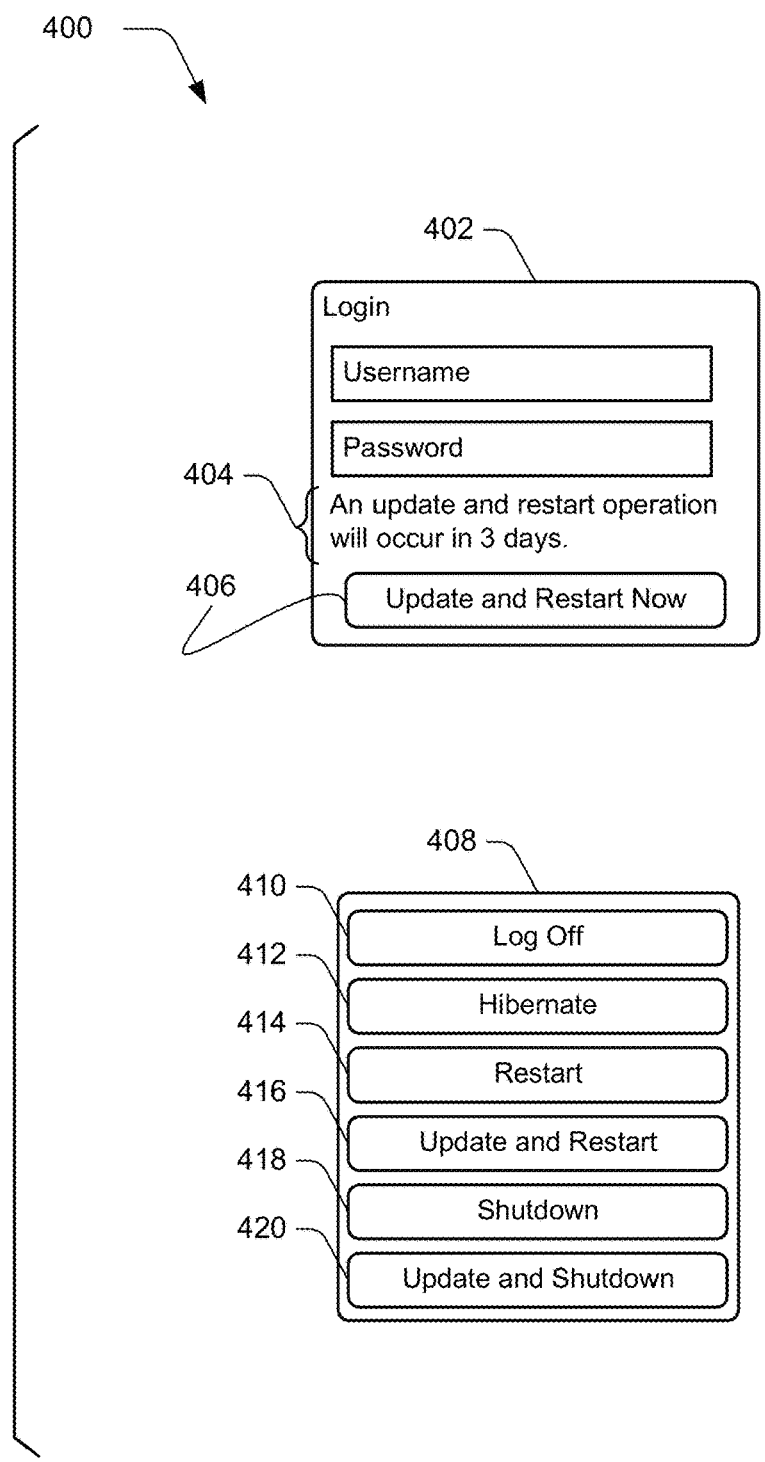
FIG. 4 illustrates an example implementation scenario in accordance with one or more embodiments.
Figure 5:
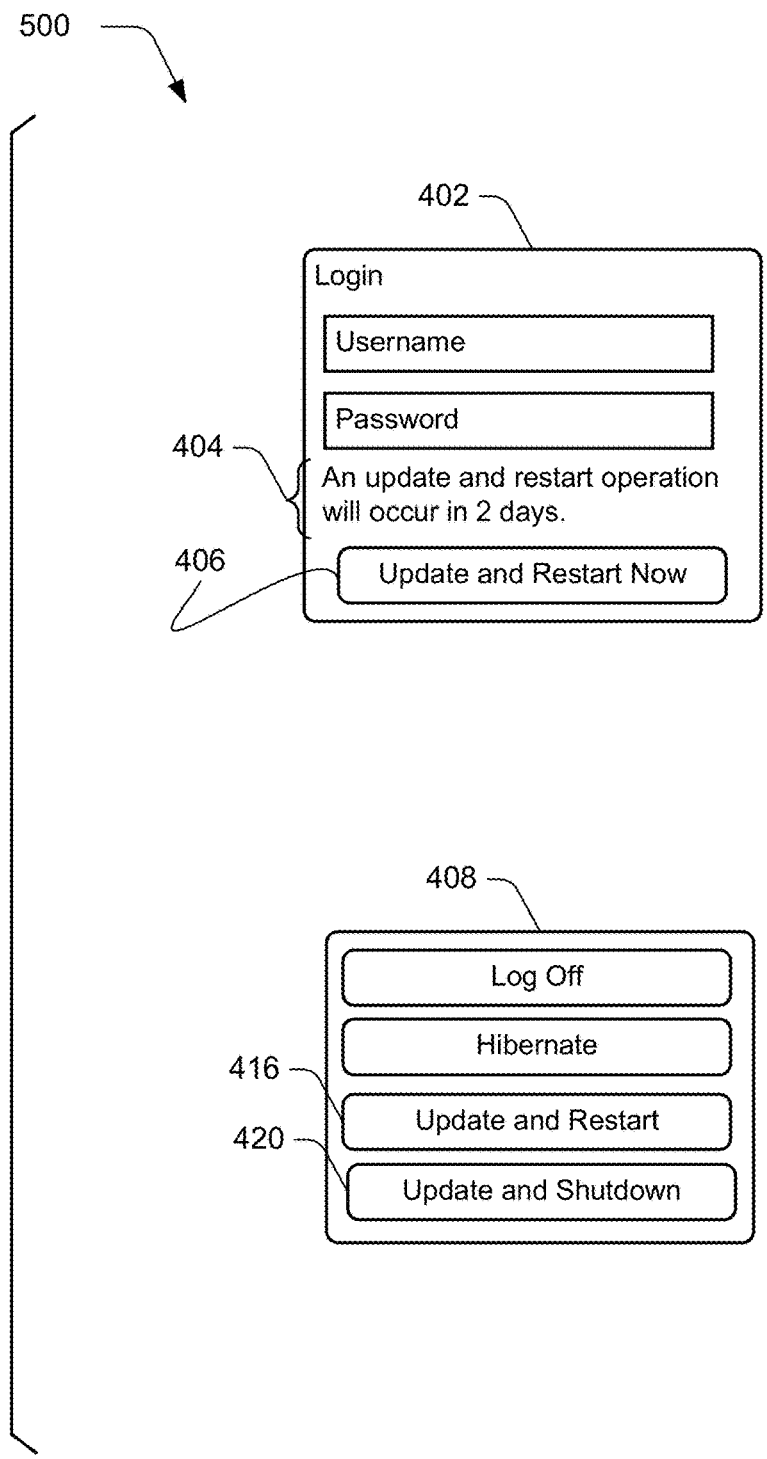
FIG. 5 illustrates an example implementation scenario in accordance with one or more embodiments.
Figure 6:
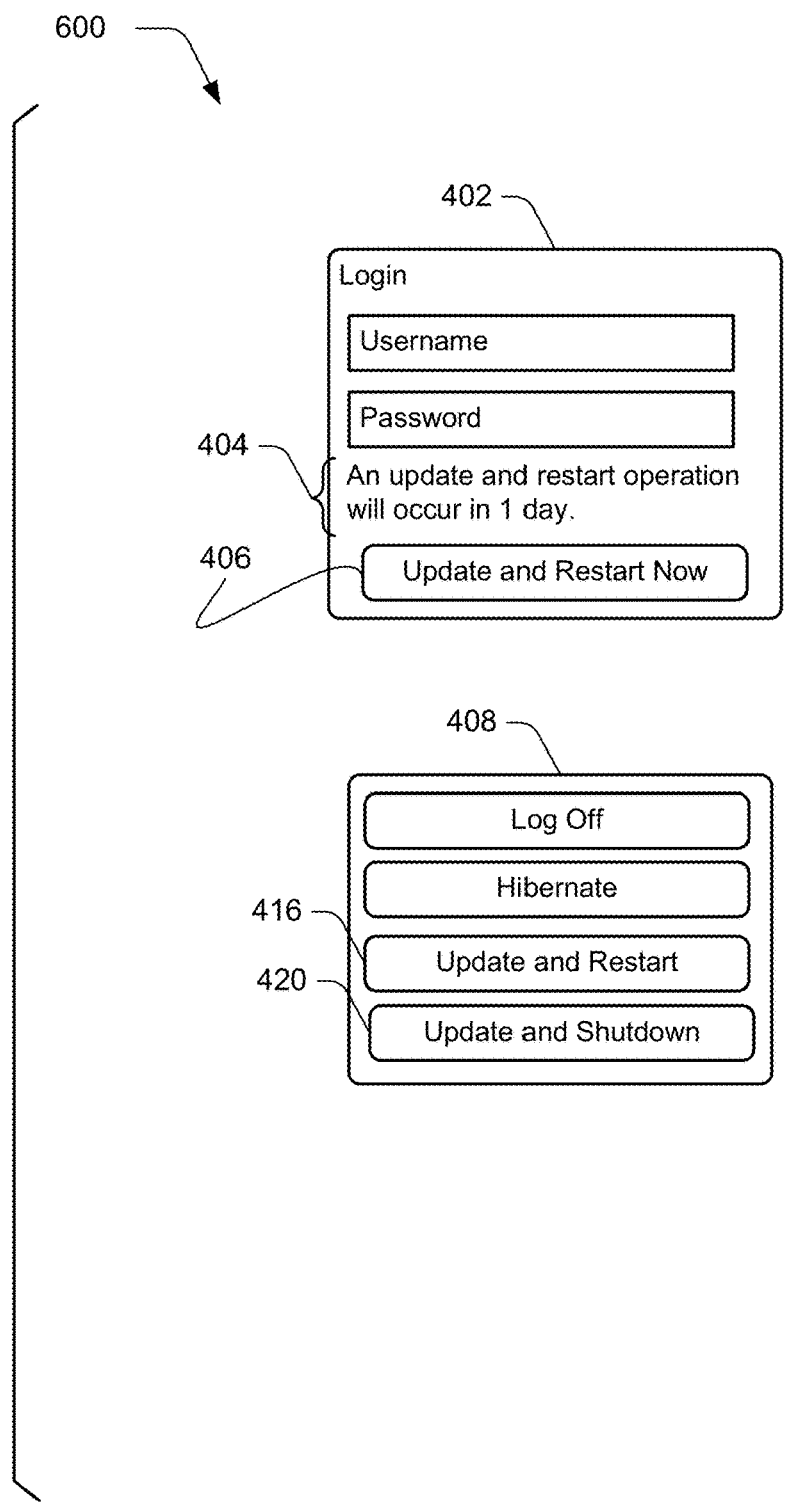
FIG. 6 illustrates an example implementation scenario in accordance with one or more embodiments.

FIGS. 4-6 illustrate example implementation scenarios for implementing an escalating notification scheme, in accordance with one or more embodiments. For purposes of the example scenarios, consider that a timer period of 3 days is specified for a restart timer. The timer period can be divided into 3 one-day intervals, e.g., day 3, day 2, and day 1. For each discrete interval, a particular notification scheme can be specified. This timer period and timer intervals are presented for purpose of example only, and a wide variety of different timer periods and/or timer intervals may be employed within the spirit and scope of the claimed embodiments. Included as part of the scenarios discussed below are various windows, notifications, menus, and so forth, that can be displayed via a device, e.g., the computing device 102.

FIG. 4 illustrates an example implementation scenario, generally at 400. The scenario 400 illustrates aspect of an example notification scheme for day 3 of the 3 day timer period referenced above.

Included as part of the scenario 400 is a login window 402, which can be presented as part of a login page for logging on to a computing device. The login window 402 includes a notification 404 of the upcoming restart and install operation, which indicates a time interval until an update and restart operation will be initiated. In this particular example, the time interval corresponds to a timer period of 3 days.

Also included as part of the login window 402 and a selectable control 406, which can be selected via user input to initiate an update and restart operation. In at least some implementations, the login window 402 can be dismissed in response to completion of a login operation.

In accordance with one or more embodiments, when there are no pending update and restart operations (e.g., there are no restart updates to be installed), the login window 402 does not include the notification 404 or the selectable control 406. Thus, when restart updates are retrieved and an update and restart operation is scheduled, the login window 402 can be visually augmented to include the notification 404, the selectable control 406, and/or other suitable notifications of the pending update and restart operation.

The scenario 400 further includes a power options menu 408, which includes various device power options. The power options menu 408 can be invoked via user input, such as selection of a selectable control configured to cause the power options menu 408 to be presented.

Power options included as part of the power options menu 408 include a log off option 410 and a hibernate option 412. Also included are a restart option 414 and an update and restart option 416. Thus, the restart option 414 can be selected to initiate a restart operation without installing updates, and the update and restart option 416 can be selected to initiate an update and restart operation.

The power options further include a shutdown option 418 and an update and shutdown option 420. The shutdown option 418 can be selected to initiate a shutdown operation without installing updates, and the update and shutdown option 420 can be selected to install updates as part of a shutdown operation.

In at least some implementations, when there are no pending update and restart operations (e.g., there are no restart updates to be installed), the power options menu 408 does not include the update and restart option 416, or the update and shutdown option 420. Thus, when restart updates are retrieved and an update and restart operation is scheduled, the power options menu 408 can be visually augmented to include the update and restart option 416, the update and shutdown option 420, and/or other suitable notifications of the pending update and restart operation.

FIG. 5 illustrates an example implementation scenario, generally at 500. Continuing the ongoing example, the scenario 500 illustrates an example implementation of a day 2 notification scheme. For instance, when a restart timer transitions from day 3 to day 2, the day 2 notification scheme illustrated in the scenario 500 can be initiated.

Included as part of the scenario 500 is the login window 402, which includes the notification 404 and the selectable control 406. As illustrated, the notification 404 has been updated to indicate that an update and restart operation will occur in 2 days.

The scenario 500 also includes the power options menu 408. In the scenario 500, the power options menu 408 has been updated such that the restart option 414 and the shutdown option 418 have been removed. Thus, a user is presented with the update and restart option 416 and the update and shutdown option 420. In at least some implementations, this removes the ability of a user to initiate a restart and/or a shutdown operation without installing updates.

While not expressly illustrated here, the day 2 notification scheme can include additional types of notifications that can be presented, such as via augmentation of other pre-existing notifications and/or menus. Examples of such notifications and/or menus include a start menu, a control panel, a device information menu, and so forth. Thus, a menu and/or notification that is not related to device restart and/or update operations can be augmented to include a notification of an upcoming restart and update operation, and may also include a selectable option to initiate a restart and update operation.

FIG. 6 illustrates an example implementation scenario, generally at 600. Continuing the ongoing example, the scenario 600 illustrates an example implementation of a day 1 notification scheme. For instance, when a restart timer transitions from day 2 to day 1, the day 1 notification scheme illustrated in the scenario 600 can be initiated.

Included as part of the scenario 600 is the login window 402, which includes the notification 404 and the selectable control 406. As illustrated, the notification 404 has been updated to indicate that an update and restart operation will occur in 1 day. The scenario 600 further includes the power options menu 408, as discussed with respect to the scenario 500, above.

While not expressly illustrated here, the day 1 notification scheme can include additional types of notifications that can be presented, such as via augmentation of other pre-existing notifications and/or menus. Examples of such notifications and/or menus include a start menu, a control panel, a device information menu, and so forth. Thus, a menu and/or notification that is not related to device restart and/or update operations can be augmented to include a notification of an upcoming restart and update operation, and may also include a selectable option to initiate a restart and update operation.

Figure 7:
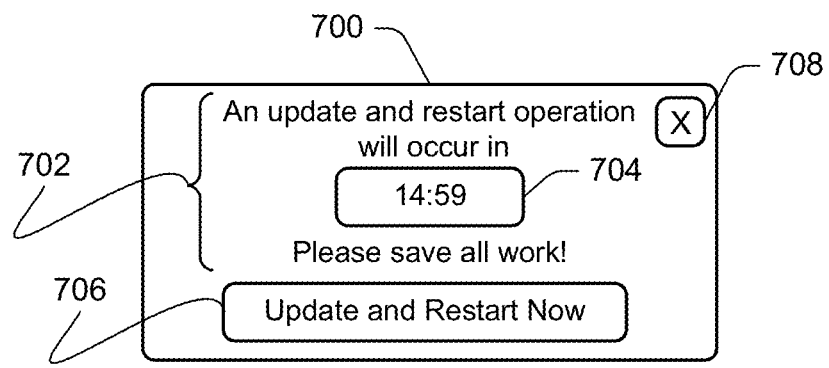
FIG. 7 illustrates an example notification window in accordance with one or more embodiments.

FIG. 7 illustrates an example notification window 700, which can be presented when a restart timer expires. For example, implementations can employ a restart countdown that is triggered when a restart timer expires. The restart countdown can be associated with a particular time period between an expiration of the restart timer, and initiation of an update and restart operation. For instance, with reference to the example implementation discussed above, the notification window 700 can presented at the end of day-1 of the timer period.

Included as part of the notification window 700 is a terminal notification 702, which includes a visual countdown 704. The terminal notification 702 indicates that an update and restart operation is imminent, and the visual countdown 704 indicates a time remaining until the update and restart operation is initiated. The visual countdown 704, for example, can be a visual representation of a time remaining in a restart countdown that occurs between an expiration of a restart timer, and initiation of an update and restart operation. In at least some implementation, the visual countdown can be visually updated as the restart countdown counts down to zero, e.g., every second, every minute, and so forth. Thus, the visual countdown 704 visually indicates an amount of time remaining on a restart countdown.

The notification window 700 further includes a selectable control 706, which is selectable to initiate an update and restart operation. For instance, selection of the selectable control 706 can initiate an update and restart operation prior to expiration of a restart countdown.

In at least some implementations, the notification window 700 is a modal window that, when presented, is presented on top of any currently-displayed windows and/or any windows that are displayed subsequently to the notification window 700 being presented. For instance, if the notification window 700 is launched (e.g., by the update module 106) and a different window is subsequently launched (e.g., by an application or other functionality), the different window can be visually layered underneath the notification window 700. Thus, the notification window 700 can be visually presented in a higher z-order than some or all other windows that are currently displayed.

The notification window 700 further includes a close button 708, which is selectable to cause the notification window 700 to be closed. In at least some implementations, if the notification window 700 is closed, it may be re-displayed periodically as a restart countdown elapses, such as every minute, every 5 minutes, and so forth. Thus, if a user closes the notification window 700, the user may again be presented with the notification window 700 as a reminder that an update and restart operation is imminent.

In at least some implementations, at the expiration of the restart countdown (e.g., when the visual countdown 704 reaches "00:00"), an update and restart operation can be automatically initiated. As discussed in detail elsewhere herein, such automatic initiation of an update and restart operation can be subject to certain conditions. Consider now some further example procedures in accordance with various embodiments.

Figure 8:
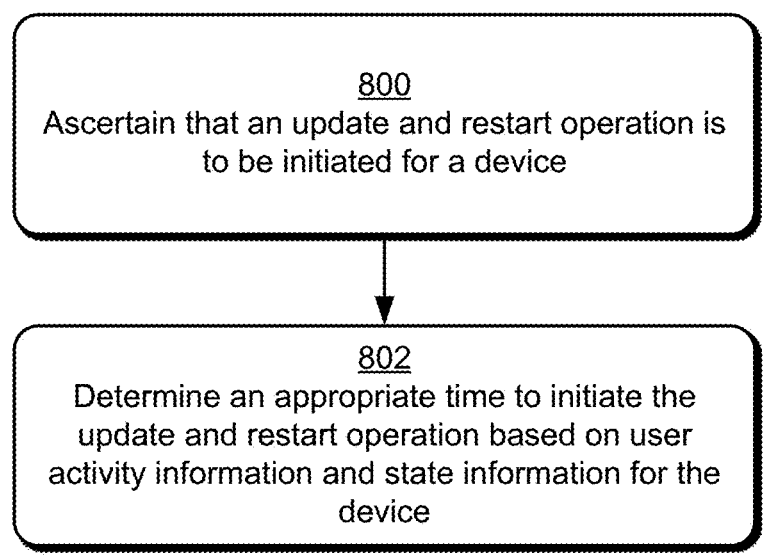
FIG. 8 is a flow diagram that describes steps in a method in accordance with one or more embodiments.

FIG. 8 is a flow diagram that describes steps in a method in accordance with one or more embodiments. In at least some implementations, the method is an extension of the methods discussed above with reference to FIGS. 2 and 3.

Step 800 ascertains that an update and restart operation is to be initiated for a device. The update module 106, for instance, can determine that an update timer has expired or is about to expire for the computing device 102. Step 802 determines an appropriate time to initiate the update and restart operation based on user activity information and state information for the device. For example, the update module 106 can delay an update and restart operation until it determines that the operation will not interfere with certain user activities (e.g., full screen viewing of content), and that the operation will not cause a loss of particular types of state information. Aspects of user activity information and device state information are detailed above and below.

Figure 9:
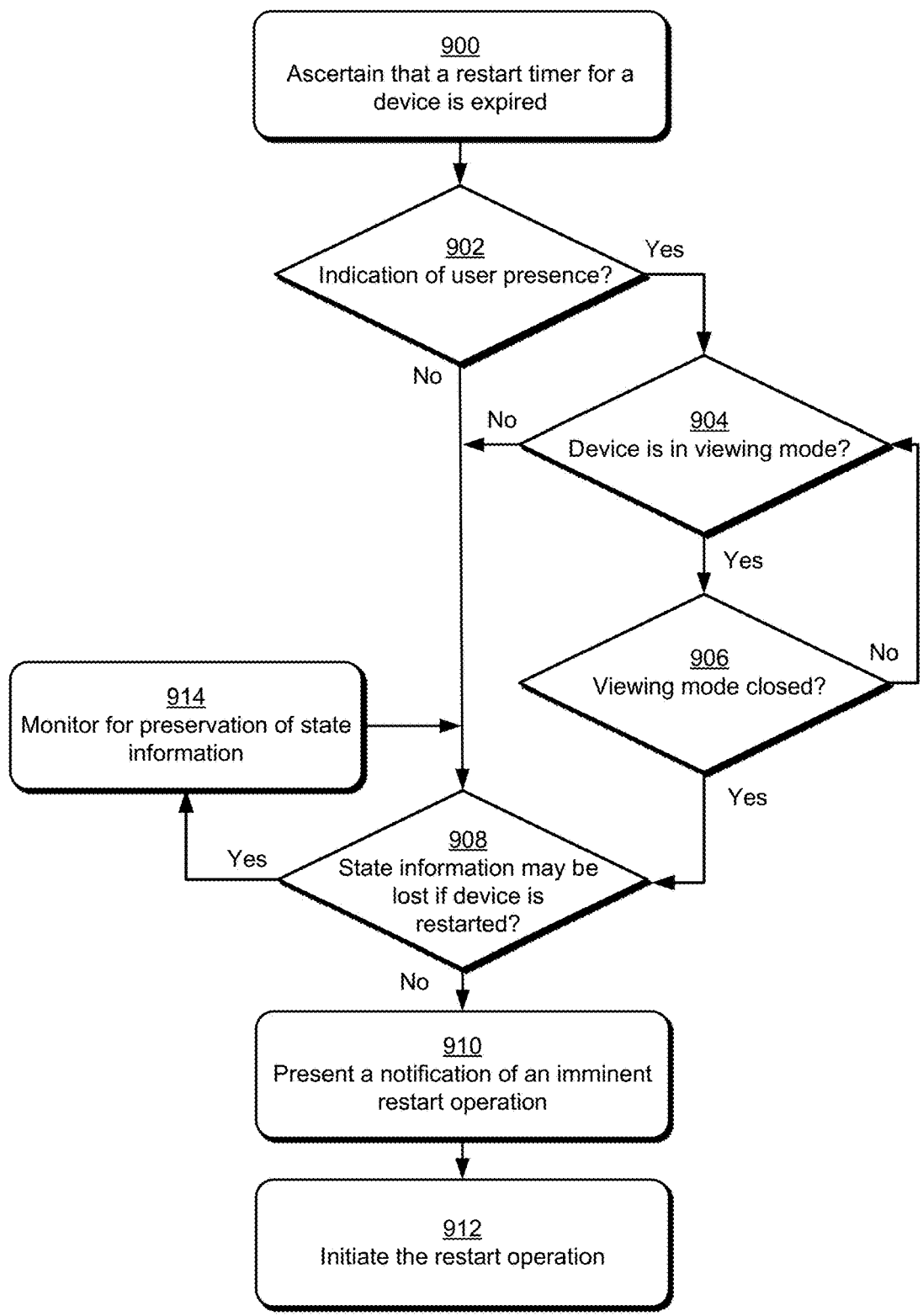
FIG. 9 is a flow diagram that describes steps in a method in accordance with one or more embodiments.

FIG. 9 is a flow diagram that describes steps in a method in accordance with one or more embodiments. In at least some implementations, the method describes a detailed embodiment of the method described with reference to FIG. 8.

Step 900 ascertains that a restart timer for a device is expired. For example, the update module 106 can ascertain that a time period for a restart timer has expired. Step 902 determines whether there is an indication of user presence at the device. A variety of different indications of user presence can be detected. For example, an indication of user presence can include detection of user interaction with a device during a particular time period. User interaction can include user input, such as a keystroke, a mouse click, cursor movement, gesture-based input (e.g., touchless input), voice input, touch input (e.g., to a touchscreen), and so forth.

A viewing mode can also be an indication of user presence. A viewing mode can include playback of video content, game content, image content (e.g., a slideshow), and/or other types of visual content. A viewing mode can also include an indication of user participation in a video communication session, such as a video conference. In at least some implementations, a viewing mode can be a full-screen mode for the display of graphical content, such as video, video games, images, and so forth.

If an indication of user presence is detected ("Yes"), step 904 ascertains whether the device is in a viewing mode. As referenced above, an indication of a viewing mode can include an indication that the device is in a full-screen mode for an application and/or content, such as for video playback, a video conference, and so forth.

If the device is in a viewing mode ("Yes"), step 906 monitors for an indication that the viewing mode is closed. For example, an exit from a full-screen mode and/or a media application can be an indication that the viewing mode is closed. While the viewing mode is still open ("No"), the process continues to monitor for an exit from the viewing mode.

If the viewing mode is closed ("Yes"), step 908 detects whether some state information may be lost if the device is restarted. State information can include a variety of different types of information. For example, state information can include information related to documents that are open on the device, such as editing states of a word processing document, a video editing project, an image that is being edited, and so forth. The update module 106, for instance, can ascertain whether a document is open on the computing device 102 such that state information for the document may be lost if the computing device 102 is restarted or shutdown.

State information can also include application state information for various applications and/or services, such as a game state for a game application that is open and/or running on the device, a communication state for a communication application that is open and/or running on the device, and so on. The update module 106, for instance, can ascertain whether a particular application or service is running on the computing device 102 such that state information for the application and/or service may be lost if the computing device 102 is restarted or shutdown.

A determination as to whether state information may be lost can also be made based on processor activity. For example, if a processor for the computing device 102 is running at or above a particular threshold percentage of capacity (e.g., 5%, 10%, 15%, and so on), it can be determined that at least one process is utilizing the processor. Thus, even if the process is not specifically identified, the presence of such processor activity can indicate that state information may be lost if a restart or shutdown operation is initiated.

These types of state information are presented for purpose of example only, and a variety of other types of state information may be considered within the spirit and scope of the claimed embodiments. For example, various types of device-related activities can be monitored to determine whether the presence of such activities indicated possible state information loss if a restart or shutdown operation is initiated. Further, state information may not refer to all state information for the device, but to selected types of state information that are deemed to be of higher importance than other types.

If an indication that state information may be lost is not detected ("No"), step 910 presents a notification of an imminent restart operation. For instance, the notification window 700 can be presented, which indicates that an update and restart operation will be initiated in particular period of time. However, a variety of different types of notifications may be employed.

Step 912 initiates the restart operation. For example, when a restart countdown expires, such as after the notification window 700 is presented, an update and restart operation can be initiated on the device. Thus, pending updates can be installed in conjunction with the restart operation.

Returning to step 908, if an indication that state information may be lost is detected ("Yes"), step 914 monitors for preservation of the state information. For example, an indication that an editing state of open document is saved can indicate that state information has been preserved, e.g., will not be lost. As another example, an application being closed (e.g., in response to user input) can indicate that the application state has been preserved.

In at least some embodiments, techniques can be employed to automatically save different types of state information prior to a restart operation. For instance, the update module 106 can notify an application associated with an open document that a restart operation is imminent. In response, the application can save an open document, and can automatically close the document and/or the application. Techniques discussed herein may also enable other types of state information to be automatically saved in response to an indication of an imminent restart operation.

Returning to step 902, if an indication of user presence is not detected ("No"), the process can proceed to step 908 discussed above.

Figure 10:
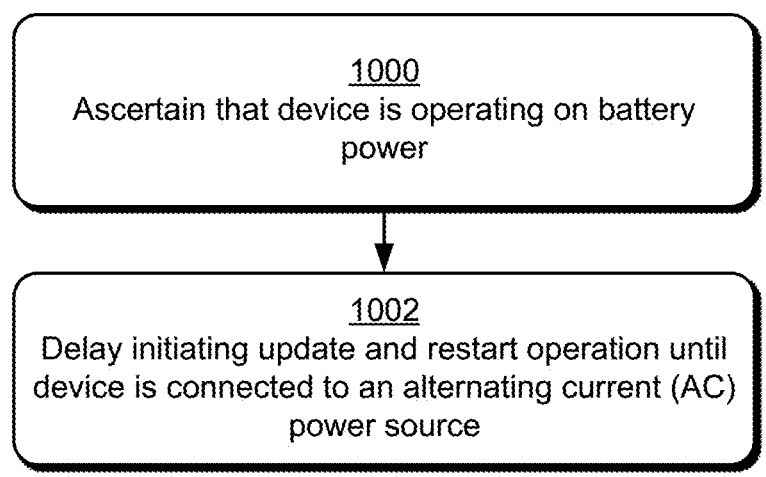
FIG. 10 is a flow diagram that describes steps in a method in accordance with one or more embodiments.

FIG. 10 is a flow diagram that describes steps in a method in accordance with one or more embodiments. In at least some implementations, the method can be implemented in conjunction with the methods discussed above. For example, the method can be implemented as a decision process between steps 900 and 902, discussed above with reference to FIG. 9.

Step 1000 ascertains that a device is operating on battery power. For example, the update module 106 can query a power-related functionality of the computing device 102, which can indicate to the update module 106 that the computing device 102 is operating under battery power. For instance, the power-related functionality can indicate that an alternating current (AC) power source is not currently available to power the computing device 102.

Step 1002 delays initiating an update operation until the device is connected to an AC power source. The update module 106, for instance, can delay initiating an update and restart and/or an update and shutdown operation until an indication that the computing device is connected to an AC power source is received.

As referenced above, this method can be implemented in conjunction with a scheduled update and restart operation. For example, the method can be implemented after an update timer has expired, before an update countdown is initiated, and/or after an update countdown has expired. The method, for instance, can be employed to prevent battery power from being used as part of an update operation, thus preserving battery power for other tasks.

While certain embodiments are discussed herein with reference to update and restart operations, it is to be appreciated that embodiments can additionally or alternatively be applied to update and shutdown operations within the spirit and scope of the claimed embodiments.

Having discussed some example procedures, consider now a discussion of an example system and device in accordance with one or more embodiments.

Example System and Device

Figure 11:
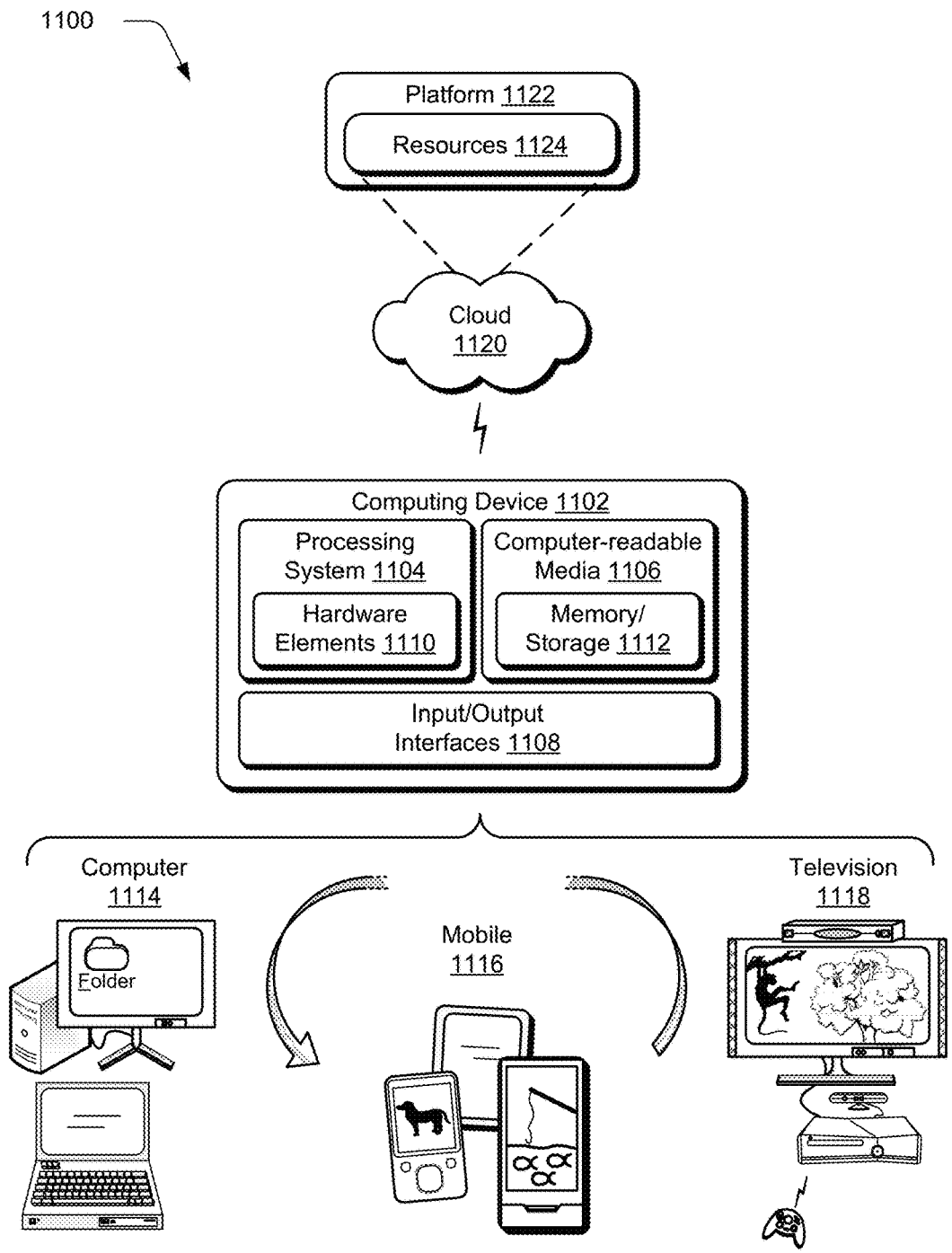
FIG. 11 illustrates an example system and computing device as described with reference to FIG. 1, which are configured to implement embodiments of techniques described herein.

FIG. 11 illustrates an example system generally at 1100 that includes an example computing device 1102 that is representative of one or more computing systems and/or devices that may implement various techniques described herein. For example, the computing device 102 discussed above with reference to FIG. 1 can be embodied as the computing device 1102. The computing device 1102 may be, for example, a server of a service provider, a device associated with the client (e.g., a client device), an on-chip system, and/or any other suitable computing device or computing system.

The example computing device 1102 as illustrated includes a processing system 1104, one or more computer-readable media 1106, and one or more I/O Interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 is illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media does not include signal bearing and transitory media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of modules as an module that is executable by the computing device 1102 as software may be achieved at least partially in hardware, e.g., through use of computer-readable storage media and/or hardware elements 1110 of the processing system. The instructions and/or functions may be executable/operable by one or more articles of manufacture (for example, one or more computing devices 1102 and/or processing systems 1104) to implement techniques, modules, and examples described herein.

As further illustrated in FIG. 11, the example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1102 may assume a variety of different configurations, such as for computer 1114, mobile 1116, and television 1118 uses. Each of these configurations includes devices that may have generally different constructs and capabilities, and thus the computing device 1102 may be configured according to one or more of the different device classes. For instance, the computing device 1102 may be implemented as the computer 1114 class of a device that includes a personal computer, desktop computer, a multi-screen computer, laptop computer, netbook, and so on.

The computing device 1102 may also be implemented as the mobile 1116 class of device that includes mobile devices, such as a mobile phone, portable music player, portable gaming device, a tablet computer, a multi-screen computer, and so on. The computing device 1102 may also be implemented as the television 1118 class of device that includes devices having or connected to generally larger screens in casual viewing environments. These devices include televisions, set-top boxes, gaming consoles, and so on.

The techniques described herein may be supported by these various configurations of the computing device 1102 and are not limited to the specific examples of the techniques described herein. For example, functionalities discussed with reference to the update module 106 and/or the update service 108 may be implemented all or in part through use of a distributed system, such as over a "cloud" 1020 via a platform 1022 as described below.

The cloud 1120 includes and/or is representative of a platform 1122 for resources 1124. The platform 1122 abstracts underlying functionality of hardware (e.g., servers) and software resources of the cloud 1120. The resources 1124 may include applications and/or data that can be utilized while computer processing is executed on servers that are remote from the computing device 1102. Resources 1124 can also include services provided over the Internet and/or through a subscriber network, such as a cellular or Wi-Fi network.

The platform 1122 may abstract resources and functions to connect the computing device 1102 with other computing devices. The platform 1122 may also serve to abstract scaling of resources to provide a corresponding level of scale to encountered demand for the resources 1124 that are implemented via the platform 1122. Accordingly, in an interconnected device embodiment, implementation of functionality described herein may be distributed throughout the system 1100. For example, the functionality may be implemented in part on the computing device 1102 as well as via the platform 1122 that abstracts the functionality of the cloud 1120.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for initiating update operations are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   one or more processors; and
   one or more computer-readable storage media comprising instructions stored thereon that, responsive to execution by the one or more processors, cause a computing device to:
   query an update service for available updates;
   implement an escalating notification scheme for presenting notifications of an upcoming update and restart operation for installing one or more updates requiring a restart operation on the computing device, wherein implementing the escalating notification scheme includes presenting to a user first options for installing, of the available updates, the one or more updates, and after an expiration of an amount of time without receiving a user selection from the first options, implementing the escalating notification scheme includes presenting to the user at least one option for installing the one or more updates, the at least one option being a subset of the first options presented to the user, wherein the at least one option prevents the user from initiating a restart operation or a shutdown operation or both without installing the one or more updates;
   determine an appropriate time to initiate the update and restart operation based on at least one of user activity information or state information for the computing device; and
   causing the update and restart operation to be performed based on the determined appropriate time.

2. The system as recited in claim 1, wherein the one or more processors are configured to initiate a restart timer for the update and restart operation, and wherein the escalating notification scheme includes a different notification scheme for different time intervals of the restart timer.

3. The system as recited in claim 1, wherein the one or more processors are configured to:
   receive updates including the one or more updates requiring a restart operation and at least one other update that does not involve a restart operation to be installed on the computing device; and
   group the one or more updates requiring a restart operation separately from the at least one other update such that the one or more updates requiring a restart operation can be installed as a group as part of the update and restart operation.

4. The system as recited in claim 1, wherein the one or more processors are configured to initiate the update and restart operation in response to a user-initiated restart operation.

5. The system as recited in claim 1, wherein the escalating notification scheme includes augmenting one or more of a pre-existing notification or a pre-existing menu with a notification of the upcoming update and restart operation.

6. The system as recited in claim 1, wherein the escalating notification scheme includes increasing a frequency of the presenting the notifications.

7. The system as recited in claim 1, wherein a notification of the presented notifications is presented as part of a login of the computing device.

8. The system as recited in claim 1, wherein the escalating notification scheme includes removing user-selectable options that do not include the update and restart operation from a menu.

9. A computer-implemented method, comprising:
   querying an update service for available updates;
   implementing an escalating notification scheme for presenting notifications of an upcoming update and restart operation for installing, of the available updates, one or more updates requiring a restart operation on a computing device, wherein implementing the escalating notification scheme includes presenting to a user first options for installing the one or more updates, and after an expiration of an amount of time without receiving a user selection from the first options, implementing the escalating notification scheme includes presenting to the user at least one option for installing the one or more updates, the at least one option being a subset of the first options presented to the user, wherein the at least one option prevents the user from initiating a restart operation or a shutdown operation or both without installing the one or more updates;
   determining an appropriate time to initiate the update and restart operation based on at least one of user activity information or state information for the computing device; and
   causing the update and restart operation to be performed based on the determined appropriate time.

10. The computer-implemented method of claim 9, further comprising initiating a restart timer for the update and restart operation, and wherein the escalating notification scheme includes different notification schemes for different time intervals of the restart timer.

11. The computer-implemented method of claim 9, further comprising:
receiving updates including the one or more updates requiring a restart operation and at least one other update that does not involve a restart operation to be installed on the computing device; and
grouping the one or more updates requiring a restart operation separately from the at least one other update such that the one or more updates requiring a restart operation can be installed as a group as part of the update and restart operation.

12. The computer-implemented method of claim 9, further comprising initiating the update and restart operation in response to a user-initiated restart operation.

13. The computer-implemented method of claim 9, wherein the escalating notification scheme includes augmenting one or more of a pre-existing notification or a pre-existing menu with a notification of the upcoming update and restart operation.

14. The computer-implemented method of claim 9, wherein the escalating notification scheme includes increasing a frequency of the presenting the notifications.

15. The computer-implemented method of claim 9, wherein a notification of the presented notifications is presented as part of a login of the computing device.

16. The computer-implemented method of claim 9, wherein the escalating notification scheme includes removing user-selectable options that do not include the update and restart operation from a menu.

17. A computer-implemented method, comprising:
querying an update service for available updates;
ascertaining that an update and restart operation is to be initiated for a device to enable one or more updates requiring a restart operation to be installed;
implementing an escalating notification scheme for presenting notifications of the update and restart operation, the escalating notification schemes including selectable controls for installing, of the available updates, the one or more updates requiring a restart operation on the device, wherein implementing the escalating notification scheme includes presenting to a user first options for installing the one or more updates, and after an expiration of an amount of time without receiving a user selection from the first options, implementing the escalating notification scheme includes presenting to the user at least one option for installing the one or more updates, the at least one option being a subset of the first options presented to the user, wherein the at least one option prevents the user from initiating a restart operation or a shutdown operation or both without installing the one or more updates;
determining an appropriate time to initiate the update and restart operation based on user activity information and state information for the device; and
causing the update and restart operation to be performed based on the determined appropriate time.

18. The computer-implemented method of claim 17, further comprising initiating a restart timer for the update and restart operation, and wherein the escalating notification scheme includes different notification schemes for different time intervals of the restart timer.

19. The computer-implemented method of claim 17, further comprising:
receiving updates including the one or more updates requiring a restart operation and at least one other update that does not involve a restart operation to be installed on the device; and
grouping the one or more updates requiring a restart operation separately from the at least one other update such that the one or more updates requiring a restart operation can be installed as a group as part of the update and restart operation.

20. The system as recited in claim 1, wherein the one or more processors are configured to:
group the available updates into a first group and a second group, wherein the first group includes the one or more updates requiring a restart operation, and a second group includes updates that do not require a restart operation.

* * * * *